US009332329B2

(12) United States Patent
Cheng et al.

(10) Patent No.: US 9,332,329 B2
(45) Date of Patent: May 3, 2016

(54) ELECTRONIC APPARATUS

(71) Applicant: HTC Corporation, Taoyuan County (TW)

(72) Inventors: Ying-Yen Cheng, Taoyuan County (TW); Yu-Jing Liao, Taoyuan County (TW); Chieh-Sheng Lin, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 153 days.

(21) Appl. No.: 14/255,972

(22) Filed: Apr. 18, 2014

(65) Prior Publication Data

US 2014/0270303 A1   Sep. 18, 2014

Related U.S. Application Data

(63) Continuation-in-part of application No. 13/629,625, filed on Sep. 28, 2012, now Pat. No. 9,137,918, and a continuation-in-part of application No. 14/182,301, filed on Feb. 18, 2014, now Pat. No. 9,253,555.

(51) Int. Cl.
*G06F 1/16* (2006.01)
*H04R 1/02* (2006.01)
(Continued)

(52) U.S. Cl.
CPC ...... *H04R 1/028* (2013.01); *G06F 1/16* (2013.01); *G06F 1/1626* (2013.01); *H04M 1/0202* (2013.01); *H04M 1/0262* (2013.01); *H04M 1/0277* (2013.01); *H04M 1/0266* (2013.01)

(58) Field of Classification Search
CPC .............. G06F 1/16; G06F 1/1601–1/1611; G06F 1/1613–1/1698; G06F 1/18–1/189; H05K 5/00–5/069; H05K 7/00–7/186

USPC .......... 361/679.01–679.45, 679.55–679.61, 361/679.01–679.02, 679.55–679.56, 361/724–821, 679.26–679.3, 361/679.31–679.39; 455/575.1–575.9; 349/56–60; 312/223.1–223.3; 348/787, 348/789, 794

See application file for complete search history.

(56) References Cited

U.S. PATENT DOCUMENTS 7,068,979 B2   6/2006   Pedersen et al.
7,369,674 B2   5/2008   Miura
(Continued)

FOREIGN PATENT DOCUMENTS

CN   101416473   4/2009
CN   101080876   7/2012
(Continued)

OTHER PUBLICATIONS

"Office Action of Taiwan Related Application", issued on May 27, 2015, p. 1-p. 5, in which the listed references were cited.
(Continued)

*Primary Examiner* — Anthony Haughton
*Assistant Examiner* — Razmeen Gafur
(74) *Attorney, Agent, or Firm* — Jianq Chyun IP Office

(57) ABSTRACT

An electronic apparatus includes the following elements. A housing has at least an opening and an accommodating space. A first circuit board is disposed in the accommodating space. A battery module disposed in the accommodating space is stacked over the first circuit board. A display module disposed in the accommodating space is stacked over the battery module. The display module is visible through the opening. A second circuit board is disposed in the accommodating space and beside the battery module. At least a part of the second circuit board is not disposed below the display module. A first speaker is disposed in the accommodating space and below the part of the second circuit board. The first speaker has a top side with a first sound hole aligned to a slot of the part of the second circuit board.

20 Claims, 8 Drawing Sheets

(51) Int. Cl.
*H04M 1/02* (2006.01)
*H05K 5/00* (2006.01)
*H05K 7/00* (2006.01)

(56) References Cited

U.S. PATENT DOCUMENTS

| | | | |
|---|---|---|---|
| 8,009,850 B2 | 8/2011 | Zhou et al. | |
| 8,280,463 B2 | 10/2012 | Hori et al. | |
| 8,390,255 B1 | 3/2013 | Fathollahi | |
| 8,456,847 B2 | 6/2013 | Hwang et al. | |
| 8,467,195 B2 | 6/2013 | Zaitsu | |
| 8,483,785 B2 | 7/2013 | Yahagi et al. | |
| 8,520,373 B2 | 8/2013 | Liu | |
| 8,619,422 B2 | 12/2013 | Lim et al. | |
| 8,654,084 B2 | 2/2014 | Hong et al. | |
| 8,693,712 B2 | 4/2014 | Sun et al. | |
| 8,737,052 B2 | 5/2014 | Cho et al. | |
| 2003/0234897 A1* | 12/2003 | Ozawa | G02F 1/133615 349/65 |
| 2004/0263482 A1 | 12/2004 | Goertz | |
| 2005/0122669 A1 | 6/2005 | Lee | |
| 2005/0141186 A1 | 6/2005 | Shimizu | |
| 2006/0158840 A1* | 7/2006 | Canova, Jr. | G06F 1/1626 361/679.56 |
| 2006/0181841 A1 | 8/2006 | Chen et al. | |
| 2006/0233356 A1* | 10/2006 | Lu | H04B 1/3838 379/433.01 |
| 2006/0250762 A1 | 11/2006 | Yang et al. | |
| 2008/0090618 A1* | 4/2008 | Lim | G06F 1/1626 455/566 |
| 2009/0015565 A1* | 1/2009 | Hong | G06F 1/1624 345/173 |
| 2009/0082073 A1 | 3/2009 | Hori et al. | |
| 2009/0117944 A1* | 5/2009 | Lee | G06F 1/1624 455/566 |
| 2009/0175018 A1* | 7/2009 | Zaitsu | H04M 1/185 361/800 |
| 2009/0186264 A1* | 7/2009 | Huang | H01M 2/1022 429/96 |
| 2009/0257189 A1* | 10/2009 | Wang | H04M 1/0249 361/679.56 |
| 2009/0316351 A1 | 12/2009 | Zadesky et al. | |
| 2009/0323292 A1* | 12/2009 | Hwang | G06F 1/1615 361/730 |
| 2010/0105452 A1* | 4/2010 | Shin | H04M 1/0277 455/575.8 |
| 2010/0124956 A1* | 5/2010 | Hong | H04M 1/23 455/575.4 |
| 2010/0134961 A1 | 6/2010 | Huang et al. | |
| 2010/0258626 A1 | 10/2010 | Watanabe et al. | |
| 2010/0273537 A1* | 10/2010 | Jiang | H04M 1/0262 455/575.1 |
| 2010/0279694 A1 | 11/2010 | Yagi et al. | |
| 2011/0021255 A1* | 1/2011 | Kim | H01Q 1/38 455/575.1 |
| 2011/0032668 A1 | 2/2011 | Lee | |
| 2011/0058320 A1 | 3/2011 | Kim et al. | |
| 2011/0077063 A1* | 3/2011 | Yabe | H04M 1/0237 455/575.4 |
| 2011/0096476 A1* | 4/2011 | Choi | H04M 1/0216 361/679.01 |
| 2011/0096482 A1* | 4/2011 | Yano | H04M 1/186 361/679.01 |
| 2011/0103028 A1* | 5/2011 | Malo | G06F 1/1656 361/753 |
| 2011/0122586 A1* | 5/2011 | Kim | H04M 1/236 361/748 |
| 2011/0164361 A1* | 7/2011 | Yoon | E05B 65/006 361/679.01 |
| 2011/0199721 A1* | 8/2011 | Allen | H04M 1/0237 361/679.01 |
| 2011/0201392 A1* | 8/2011 | Spoto | H01Q 1/243 455/575.4 |
| 2011/0216485 A1 | 9/2011 | Kang et al. | |
| 2011/0222219 A1* | 9/2011 | Bae | H01Q 1/243 361/679.01 |
| 2011/0222260 A1* | 9/2011 | Goro | G06F 1/1681 361/814 |
| 2011/0261510 A1 | 10/2011 | Liu | |
| 2011/0261514 A1 | 10/2011 | Lee et al. | |
| 2011/0279947 A1 | 11/2011 | Peng | |
| 2011/0292578 A1* | 12/2011 | Lim | H04M 1/0239 361/679.01 |
| 2011/0317343 A1 | 12/2011 | Shin et al. | |
| 2012/0111711 A1 | 5/2012 | Cho et al. | |
| 2013/0070947 A1 | 3/2013 | Chien et al. | |

FOREIGN PATENT DOCUMENTS

| | | |
|---|---|---|
| CN | 202364343 | 8/2012 |
| CN | 103221896 | 7/2013 |
| TW | M350195 | 2/2009 |

OTHER PUBLICATIONS

"Office Action of US parent Application", issued on Jun. 4, 2014, p. 1-p. 11, in which the listed references were cited.
"Office Action of U.S. Appl. No. 13/629,625," issued on Sep. 24, 2014, p. 1-p. 17, in which the listed references were cited.
"Notice of Allowance of U.S. Counterpart Application", issued on Jan. 30, 2015, p. 1-p. 11, in which the listed reference 1-3 were cited.
"Notice of Allowance of U.S. Counterpart Application", issued on May 8, 2015, p. 1-p. 12, in which the listed reference4-16 were cited.
"Office Action of Taiwan Counterpart Application," issued on Sep. 26, 2014, p. 1-p. 8, in which the listed references were cited.
"Office Action of US. Related Application", issued on Sep. 16, 2015, p. 1-p. 21, in which the listed reference was cited.

* cited by examiner ent application Ser. No. 14/182,301,
ELECTRONIC APPARATUS

CROSS-REFERENCE TO RELATED APPLICATION

This application is a continuation-in-part application of and claims the priority benefit of a prior application Ser. No. 13/629,625, filed on Sep. 28, 2012, now pending. This application is also a continuation-in-part application of and claims the priority benefit of a prior application Ser. No. 14/182,301, filed on Feb. 18, 2014, now pending. The entirety of each of the above-mentioned patent applications is hereby incorporated by reference herein and made a part of this specification.

FIELD OF THE INVENTION

The application relates to an electronic apparatus.

DESCRIPTION OF RELATED ART

In recent years, as the technology advances, handheld devices such as mobile phones, tablet computers are more commonly used and are developed to be more convenient, multi-functional and exquisite. More and more choices like the aforementioned are provided for consumers to choose from. Users have higher demands toward the handheld devices day by day. As the time prolongs for users to hold handheld devices by hands, the feeling in holding handheld devices are getting more important.

In order to enhance the feeling in holding handheld devices, a housing surface of handheld electronic devices are often designed to have a curved surface to conform designs of ergonomics. However, according to the current stacking method of interior space of handheld devices, a battery is closer to a housing of a handheld device than a motherboard, and therefore such handheld device cannot present a smooth arc shape due to the battery disposition.

SUMMARY OF THE INVENTION

The application is directed to an electronic apparatus with a smooth and curved surface of a housing.

The application provides an electronic apparatus including a housing, a first circuit board, at least one second circuit board, a battery module and a display module. The housing has at least an opening and an accommodating space. The first circuit board is disposed in the accommodating space. The battery module is disposed in the accommodating space and stacked over the first circuit board. The display module is disposed in the accommodating space and stacked over the battery module. At least one edge of the battery module in a width direction of the battery module is closer to a corresponding side of the housing than a corresponding edge of the first circuit board in a width direction of the first circuit board. At least one second circuit board disposed in the accommodating space and stacked over the display module, beside the battery module, wherein the at least one second circuit board has a speaker.

The application provides an electronic apparatus includes the following elements. An electronic apparatus includes the following elements. A housing has at least an opening and an accommodating space. A first circuit board is disposed in the accommodating space. A battery module disposed in the accommodating space is stacked over the first circuit board. A display module disposed in the accommodating space is stacked over the battery module. The display module is visible through the opening. A second circuit board is disposed in the accommodating space and beside the battery module. A part of the second circuit board is not disposed below the display module. A first speaker is disposed in the accommodating space and below the part of the second circuit board. The first speaker has a top side with a first sound hole aligned to a slot of the part of the second circuit board.

In light of the foregoing, in the application, an appearance of a housing of an electronic apparatus can be presented as a smooth and curved surface to effectively utilize a space inside the housing and increase a capacity of a battery module.

In order to make the aforementioned features and advantages of the application more comprehensible, embodiments accompanying figures are described in details below.

DESCRIPTION OF EMBODIMENTS

Figure 1:
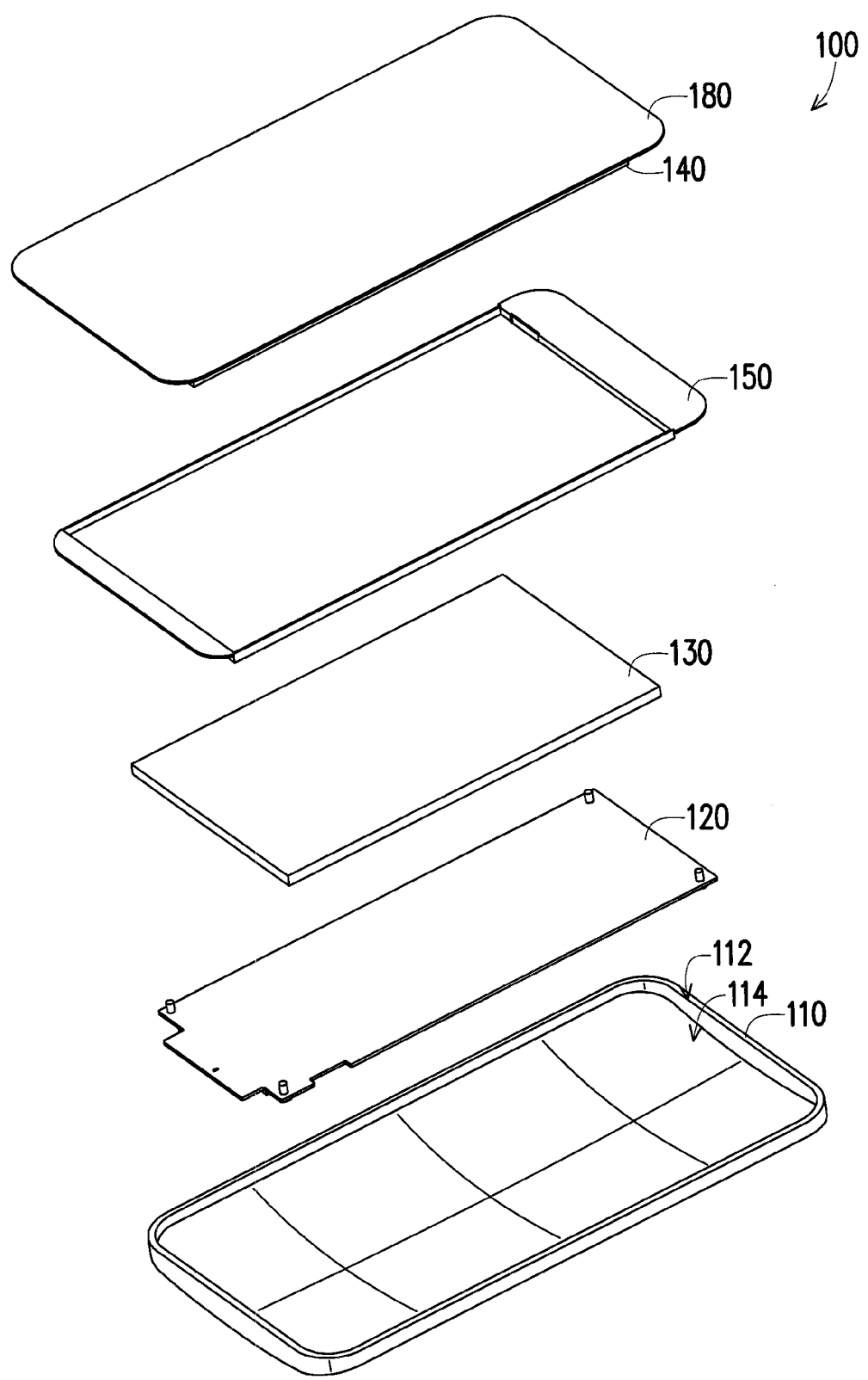
FIG. 1 is an exploded view of an electronic apparatus according to an embodiment of the application.
Figure 2:
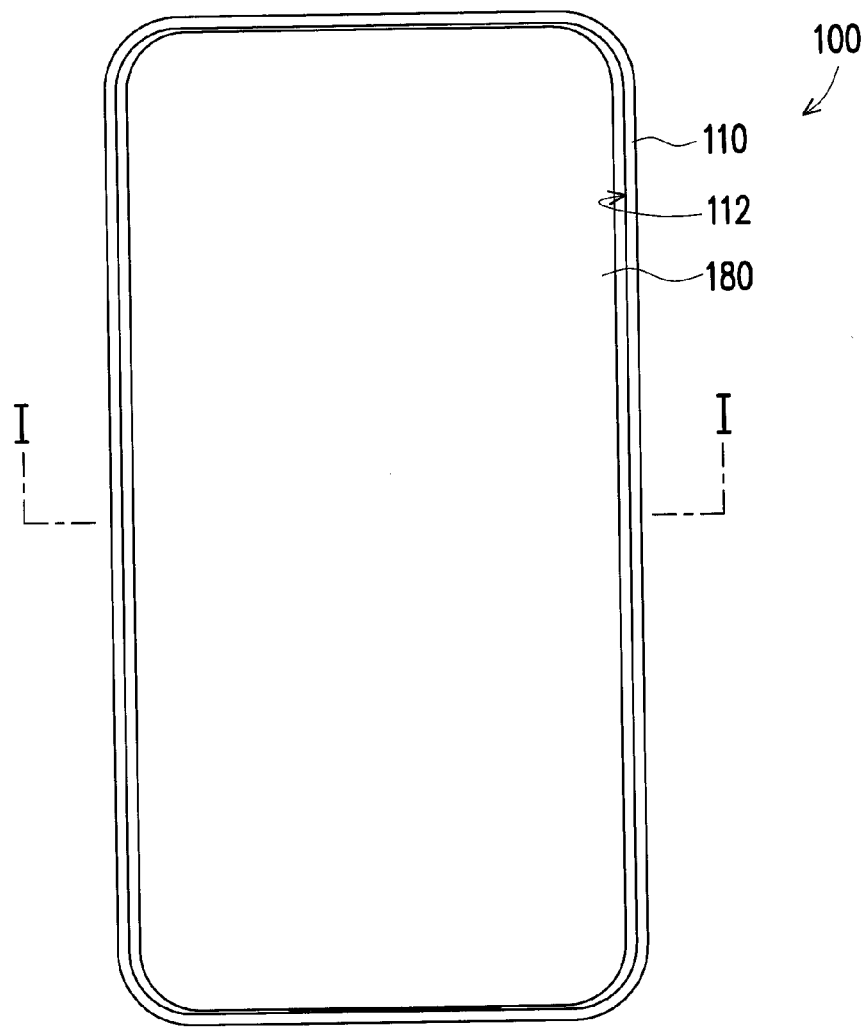
FIG. 2 is a front view of an assembled electronic apparatus of FIG. 1.
Figure 3:
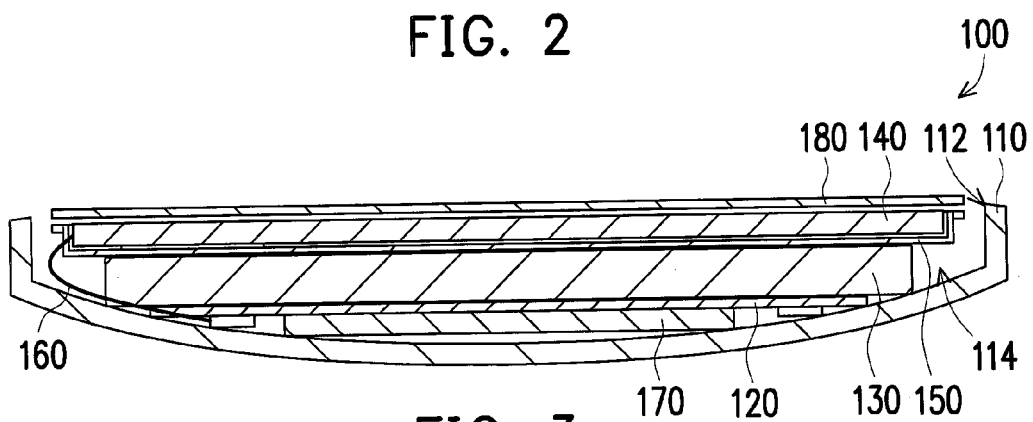
FIG. 3 is an enlarged cross-sectional view of the electronic apparatus along the line I-I of FIG. 2.

FIG. 1 is an exploded view of an electronic apparatus according to an embodiment of the application. FIG. 2 is a front view of an assembled electronic apparatus of FIG. 1. FIG. 3 is an enlarged cross-sectional view of the electronic apparatus along the line I-I of FIG. 2. Referring to FIG. 1 to FIG. 3. In the present embodiment, an electronic apparatus 100 includes a housing 110, a motherboard 120, a battery module 130 and a display module 140.

The housing 110 has at least an opening 112 and an accommodating space 114. The motherboard 120 is disposed in the accommodating space 114, wherein the motherboard 120 includes a rigid circuit board and a plurality of electronic components mounted on the rigid circuit board. The battery module 130 is disposed in the accommodating space 114 and stacked over the motherboard 120, wherein the motherboard 120 is located between the housing 110 and the battery module 130. The display module 140 is disposed in the accommodating space 114 and stacked over the battery module 130, wherein the battery module 130 is located between the motherboard 120 and the display module 140. The display module 140 can have either a plug-in or build-in touch module.

In the present embodiment, a width of the motherboard 120 is smaller than a width of the battery module 130, and the width of the battery module 130 is smaller that a width of the display module 140. Accordingly, an appearance of the housing 110 can be presented as a smooth arc shape. Meanwhile, the width of the battery module 130 is widened when the battery module 130 is moved to a location between the motherboard 120 and the display module 140. As a result, with the same length and thickness, the width of the battery module 130 is widened to increase a capacity of the battery module 130.

It should be noted that any width of any member disclosed in the application is a width in a horizontal direction of the member illustrated in FIG. 2 or FIG. 3.

Figure 4:
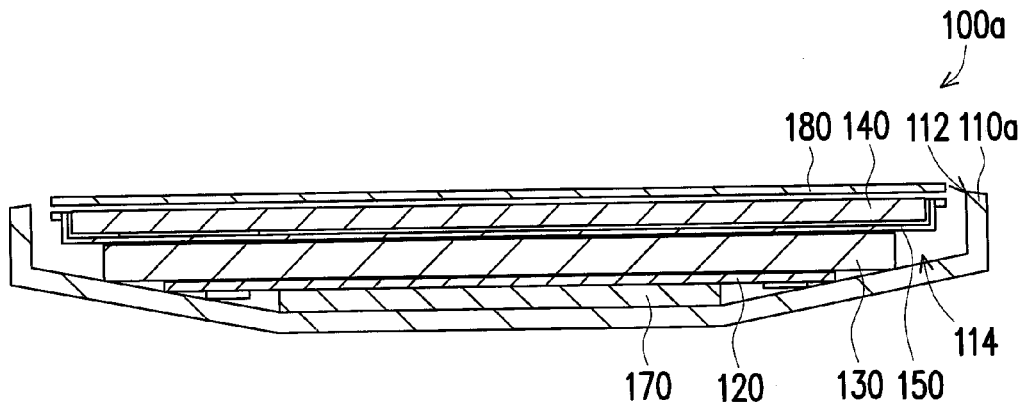
FIG. 4 is an enlarged cross-sectional view of an electronic apparatus according to another embodiment of the application.

Referring to FIG. 3 again. In the present embodiment, the housing 110 can extend along a curved surface, and edges of the motherboard 120 and edges of the battery module 130 lean against the housing 110. In another embodiment illustrating an electronic apparatus 100a, as shown in FIG. 4, a housing 110a can extend along an inclined plane.

Referring to FIG. 1 and FIG. 3 again. In the present embodiment, the electronic apparatus 100 further includes a frame 150 wherein the frame 150 is disposed between the battery module 130 and the display module 140 to secure a relative position between the battery module 130 and the display module 140.

Referring to FIG. 3 again. In the present embodiment, the electronic apparatus 100 further includes a flexible printed circuit board 160 that connects the motherboard 120 and the display module 140. Specifically, the flexible printed circuit board 160 bypasses the battery module 130 and connects the motherboard 120 and the display module 140.

Referring to FIG. 3 again. In the present embodiment, the electronic apparatus 100 further includes a shield member 170 disposed in the accommodating space 114, wherein the shield member 170 is located between a bottom of the housing 110 and the motherboard 120, and a width of the shield member 170 is smaller than the width of the motherboard 120.

Referring to FIG. 1 and FIG. 3 again. In the present embodiment, the electronic apparatus 100 further includes a cover plate 180 disposed at the opening 112 of the housing 110, such that the display module 140 is located between the battery module 130 and the cover plate 180. The width of the display module 140 is smaller than a width of the cover plate 180.

Figure 5:
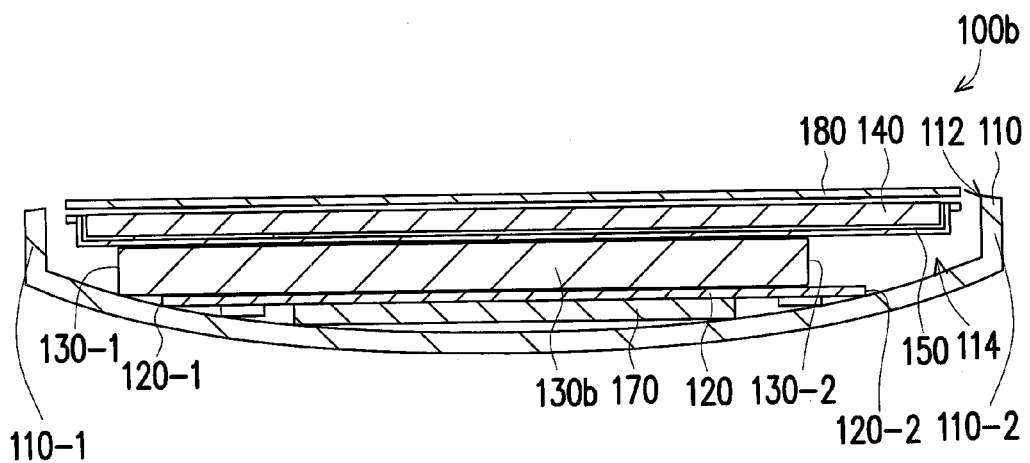
FIG. 5 is an enlarged cross-sectional view of an electronic apparatus according to yet another embodiment of the application.

FIG. 5 is an enlarged cross-sectional view of an electronic apparatus according to yet another embodiment of the application. Referring to FIG. 5. According to an electronic apparatus 100b of the present embodiment, one edge 130-1 of a battery module 130b in a width direction of the battery module 130b is closer to a corresponding side 110-1 of the housing 110 than a corresponding edge 120-1 of the motherboard 120 in a width direction of the motherboard 120. In addition, one edge 130-2 of the battery module 130b in a width direction of the battery module 130b is not closer to a corresponding side 110-2 of the housing 110 than a corresponding edge 120-2 of the motherboard 120 in a width direction of the motherboard 120. As a result, according to embodiments of FIG. 3 and FIG. 5, at least one edge of the battery module in a width direction of the battery module is closer to a corresponding side of the housing than a corresponding edge of the motherboard in a width direction of the motherboard.

Figure 6:
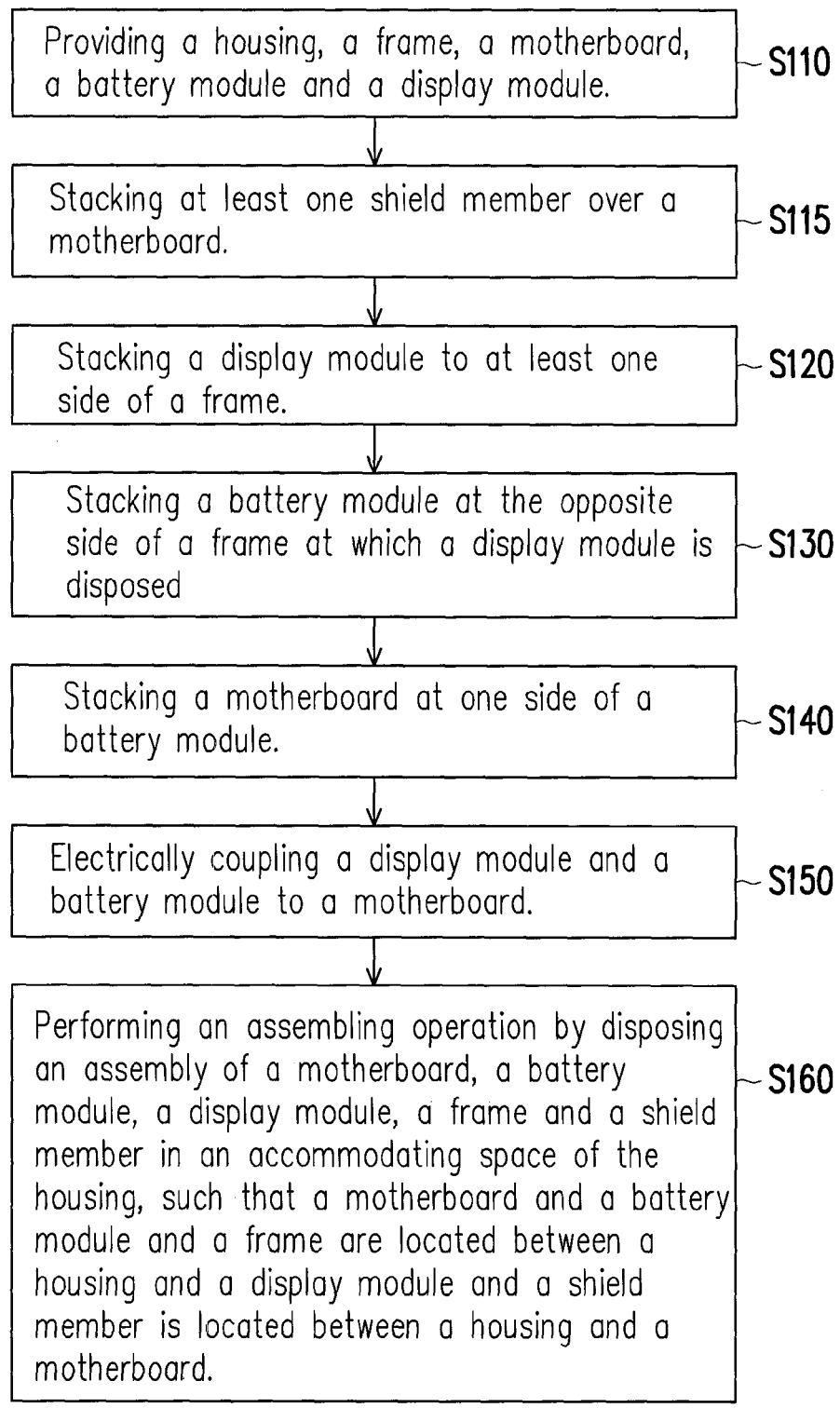
FIG. 6 is a flow chart of a method for assembling an electronic apparatus according to an embodiment of the application.

FIG. 6 is a flow chart of a method for assembling an electronic apparatus according to an embodiment of the application. Referring to FIG. 1 and FIG. 6. In Step S110, the housing 110, the motherboard 120, the battery module 130, the display module 140 and the frame 150 are provided, wherein the housing 110 has the opening 112 and the accommodating space 114, the width of the motherboard 120 is smaller than the width of the battery module 130, and the width of battery module 130 is smaller than the width of the display module 140. In Step S120, the display module 140 is stacked at one side of the frame 150.

In Step S130, the battery module 130 is stacked at the opposite side of the frame 150 at which the display module 140 is disposed. In Step S140, the motherboard 120 is stacked at one side of the battery module 130. In Step S150, the display module 140 and the battery module 130 are electrically coupled to the motherboard 120. In Step S160, an assembling operation is performed, wherein an assembly of the motherboard 120, the battery module 130, the display module 140 and the frame 150 are disposed in the accommodating space 114 of the housing 110.

Referring to FIG. 3 and FIG. 6. The present embodiment further includes Step S115. In Step S115, before performing the assembling operation (Step S160), the shield member 170 is stacked over the motherboard 120, wherein the width of the shield member 170 is smaller than the width of the motherboard 120. After the assembling operation (Step S160) is performed, the shield member 170 is also disposed in the accommodating space 114 and located between the housing 110 and the motherboard 120.

Referring to FIG. 3 and FIG. 6. In the present embodiment, a step of electrically coupling the display module 140 to the motherboard 120 in Step S150 includes having the flexible printed circuit board 160 bypassing the battery module 130 and connecting the display module 140 and the motherboard 120.

Furthermore, another circuit board carrying speaker can be assembled together but still keeping the smooth curving shape of the housing. For easy description, the motherboard can also be referred as a first circuit board, and the circuit board carrying speaker can be referred as a second circuit board.

Figure 7:
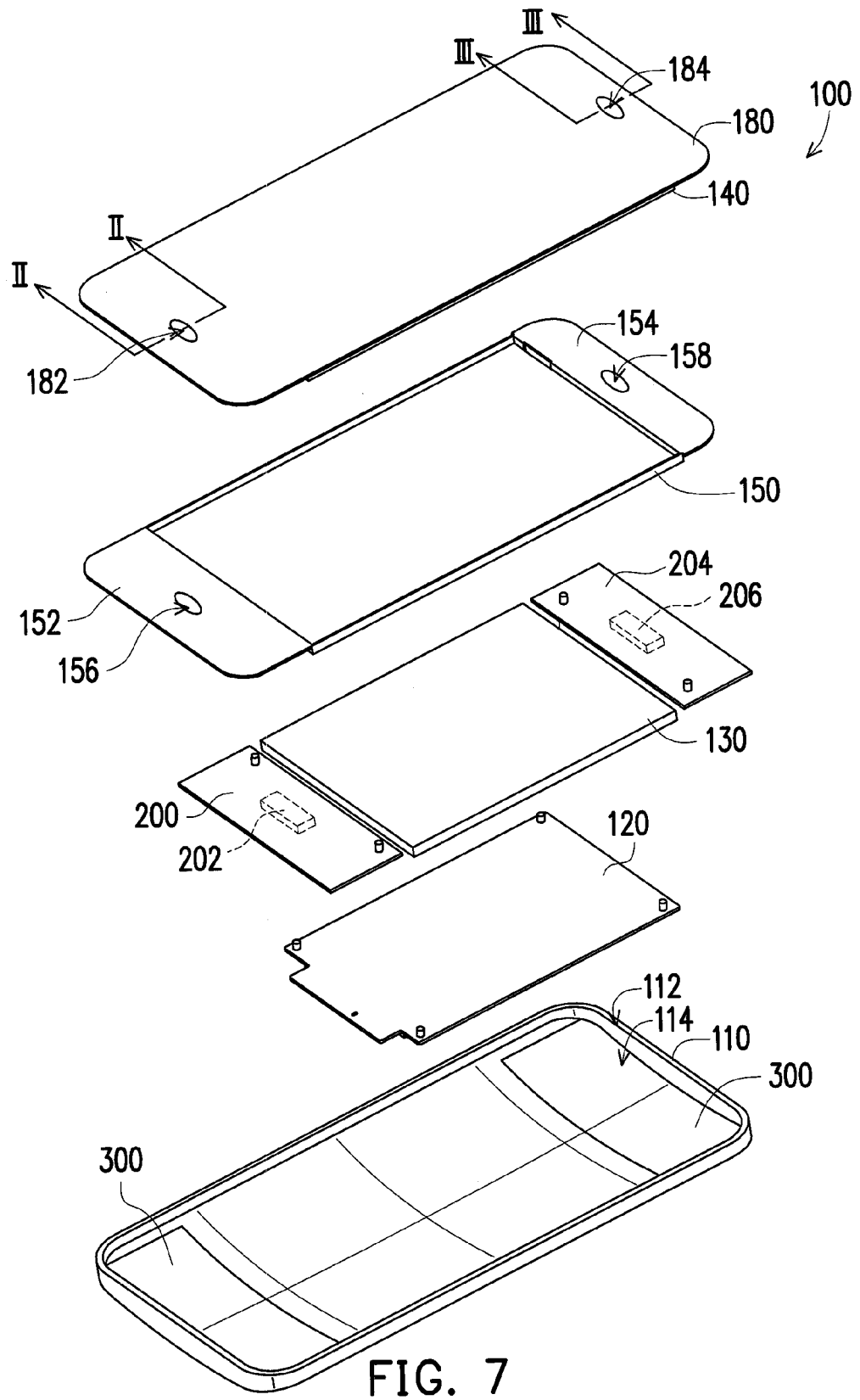
FIG. 7 is an exploded view of an electronic apparatus according to another embodiment of the application.

FIG. 7 is an exploded view of an electronic apparatus according to another embodiment of the application. In FIG. 7, the assembly structure is similar to the structure shown in FIG. 1. However, at least one circuit board is further included. In the embodiment, a second circuit board 200 and a third circuit board 204 are provided as an example. The second circuit board 200 and the third circuit board 204 respectively carry a first speaker 202 and a second speaker 206 and, like the battery 130, are disposed below the display module 140, in which the second circuit board 200 and the third circuit board 204 are actually disposed on the frame 150 as an example. The display module 140 is visible through the opening 112. The first speaker 202 is disposed in the accommodating space 114 and disposed below the second circuit board 200. The second speaker 206 is also disposed in the accommodating space 114 and disposed below the third circuit board 204.

The frame 150 is stacked over the battery module 130 and disposed below the display module 140 to secure a relative position between the battery module 130 and the display module 140. The frame 150 has at least one protruding end plate, such as two protruding end plates 152, 154, corresponding to the second circuit board 200 and the third circuit board 204. As a result, for example, the stereo sound effect can be achieved by the first speaker 202 and the second speaker 206. Each of the protruding end plates 152, 154 of the frame 150 has an aperture 156, 158, which are respectively aligned to the first speaker 202 and the second speaker 206. Further, the cover plate 180 also has at least one acoustic port, such as two acoustic ports 182, 184, which are also respectively aligned to the first speaker 202 and the second speaker 206. End sides of the display module 140 extend to the acoustic ports 182, 184 respectively, but does not covering the acoustic ports 182, 184. Further, each of the second circuit board 200 and the third circuit board 204 may also have a proper opening without stopping the sound from the speaker. As a result, the sound from the speaker can be transported to the external environment from the cover plate 180.

Basically, the second circuit board 200 and the third circuit board 204 are not higher than the battery module 130, so the second circuit board 200 and the third circuit board 204 can be well disposed in the accommodating space 114 to fit the shape of the housing 110. The second circuit board 200 and the third circuit board 204 are beside the battery module 130 on the frame 150 as a general example.

As to the design of the structure to adapt the speaker, it can be categorized into two side types: bottom (bot) side type and top side type, depending on the sound-exiting side of the speaker is in front of the circuit board as the top side type or the speaker is behind the circuit board as the bottom side type.

FIG. 8-12 are enlarged cross-sectional views of the electronic apparatus, cutting at line II-II in FIG. 7, according to other embodiments of the application.

Figure 8:
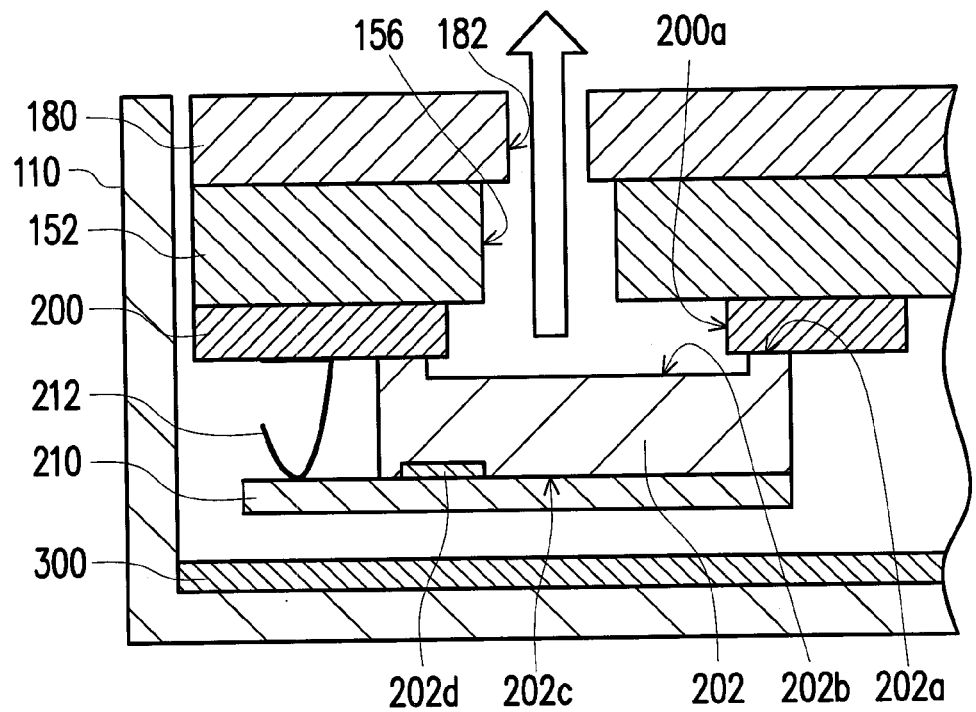
FIG. 8-12 are enlarged cross-sectional views of the electronic apparatus, cutting at line II-II in FIG. 7, according to other embodiments of the application.

In FIG. 8, the speaker is one in design of bottom side type, as an example. The sound from the first speaker 202 is indicated by thick arrow. In this structure, the second circuit board 200 has a slot 200a, the protruding end plate 152 also has the aperture 156 indicated in FIG. 7, and the cover plate 180 also has the acoustic port 182, so that the sound can be transported forwardly out from the cover plate 180. The first speaker 202 has a top side 202a with a first sound hole 202b and a bottom side 202c with a first contact point 202d, and the first contact point 202d is electrically connected to the second circuit board 200. Here, a first conductive part 210 may also needed to electrically connect the first speaker 202, so that the first speaker 202 can be electrically connected to the second circuit board 200 via the first conductive part 210 and a second conductive part 212. The second conductive part 212 contacts the first conductive part 210 and the second circuit board 200 separately. The first conductive part 210 may be a flexible printed circuit board, and the second conductive part 212 may be a conductive elastic pad.

In FIG. 8, the second circuit board 200, the first speaker 202 and the first conductive part 210 may be rather close to the housing 110, which usually has an antenna 300. Since the second circuit board 200 may affect the antenna 300, served by the housing 110, the second circuit board 200 should be stacked over the first speaker 202 in order to increase the distance between the second circuit board 200 and the antenna 300. In the embodiment, the second circuit board 200 need not be too close to the housing 110 with the antenna 300, and the first conductive part 210 is distant from the housing 110.

Figure 9:
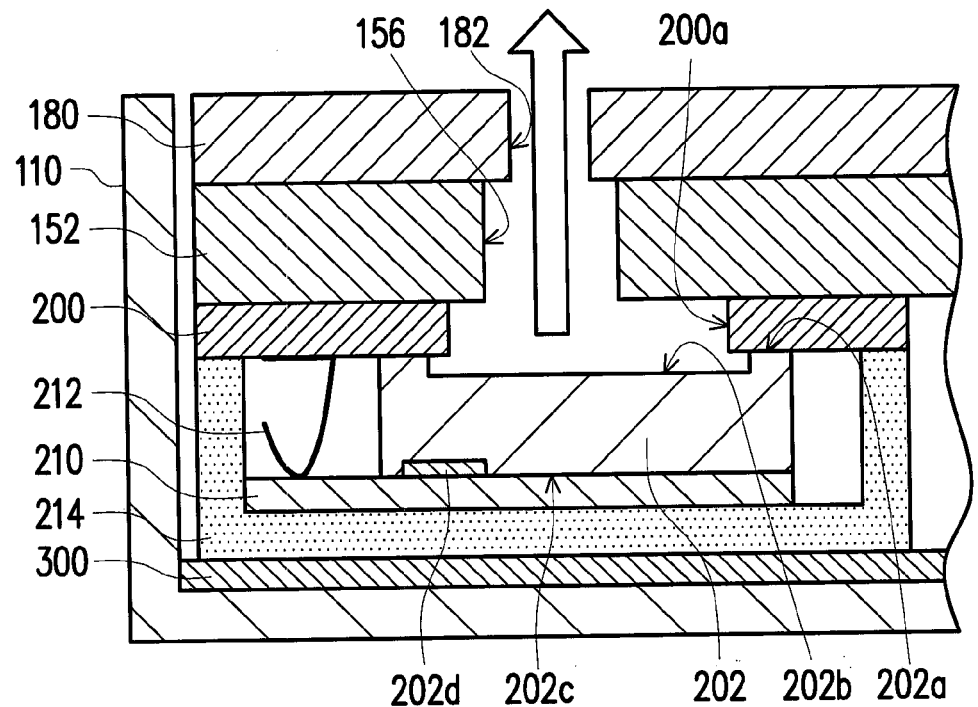

Further in FIG. 9, it is also another design of bottom side type. However, an additional cap structure 214 can cover the first speaker 202. The cap structure 214 can also prevent the influence on the antenna 300.

Figure 10:
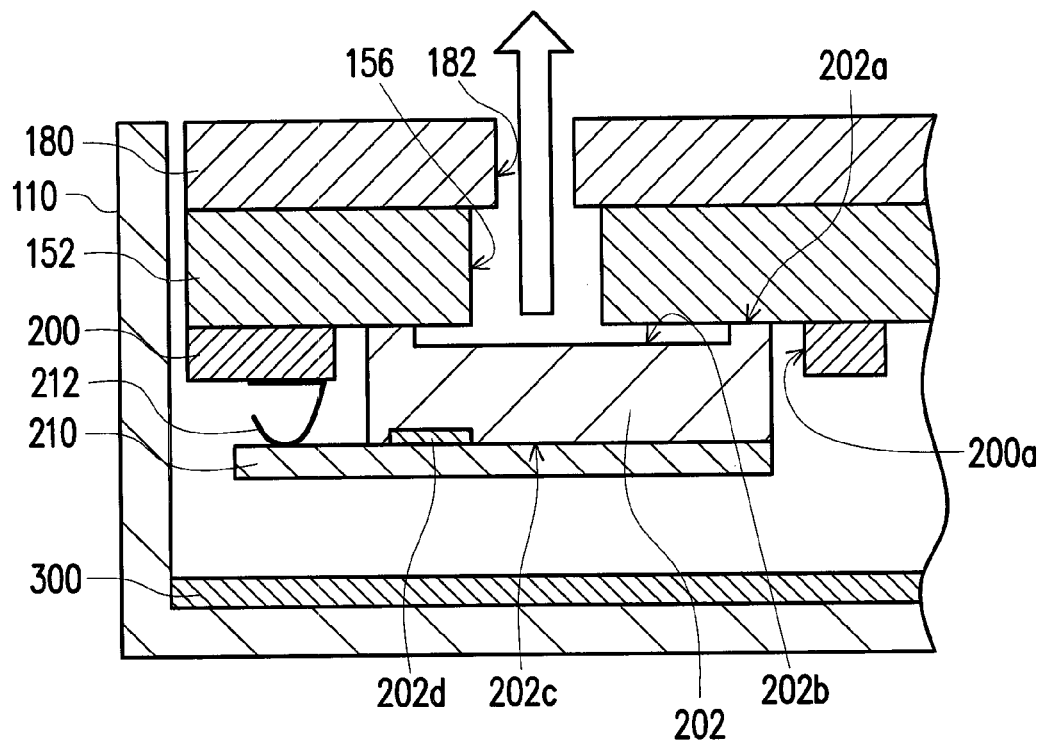

In FIG. 10, based on the structure of FIG. 9, the sound exiting side of the first speaker 202 may also be disposed below the protruding end plate 152 of the frame 150 via the slot 200a of the second circuit board 200, and the slot 200a of the second circuit board 200 may be sufficiently large to adapt the first speaker 202.

Figure 11:
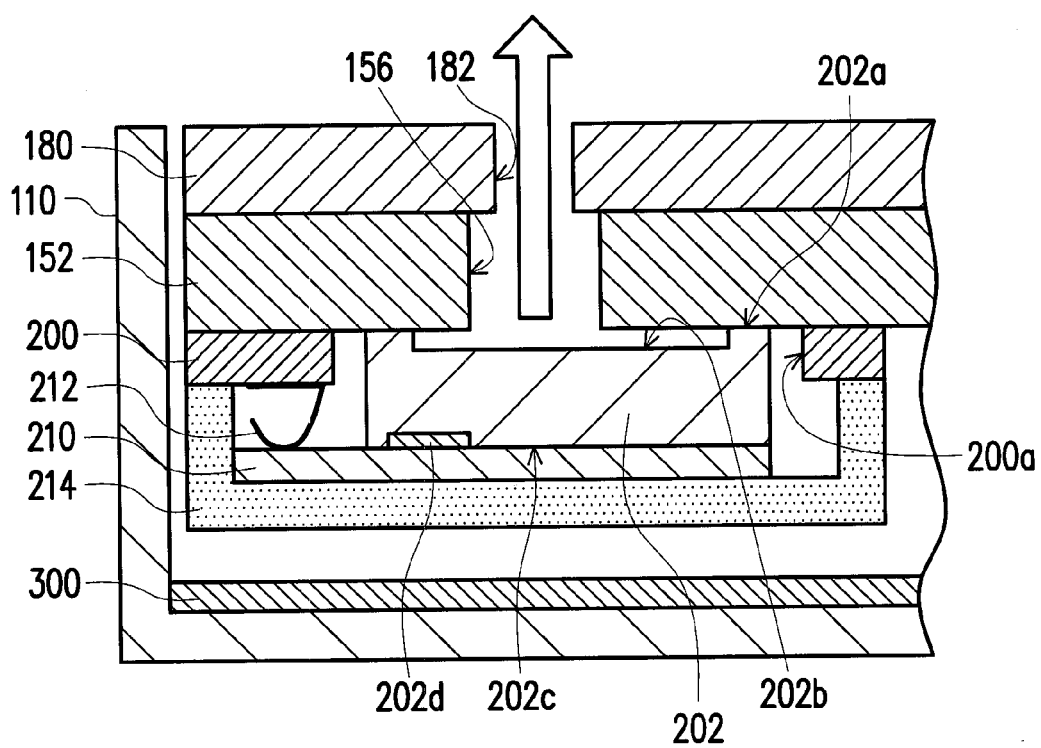

Further in FIG. 11, it is also another design of bottom side type. However, an additional cap structure 214 can cover the first speaker 202.

Figure 12:
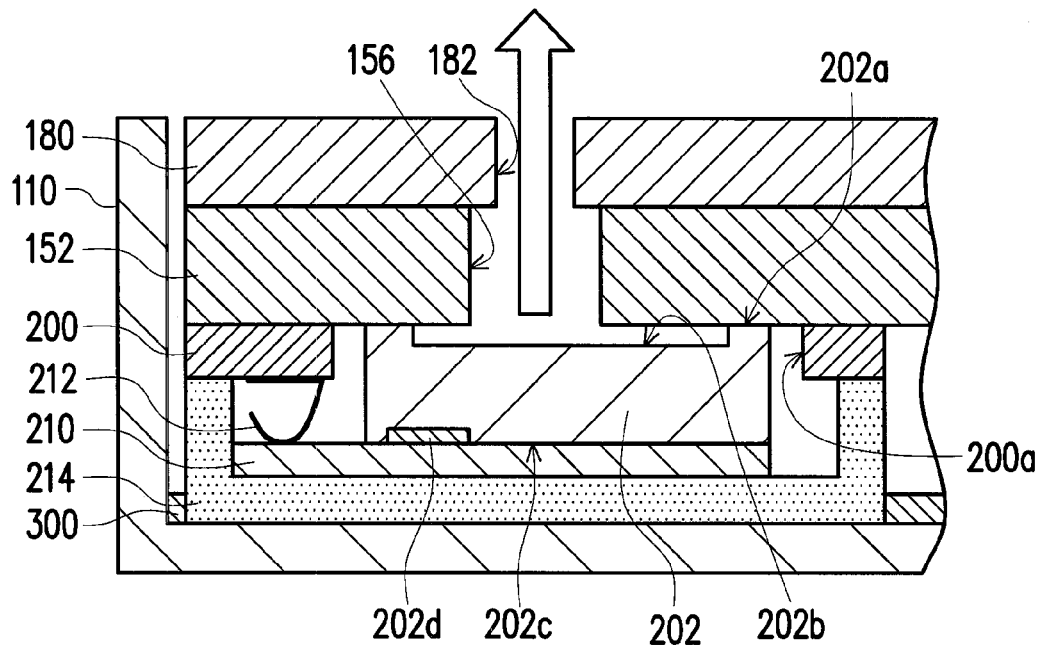

Further in FIG. 12, the housing 110 has a cap structure 214 corresponding to the first speaker 202 and covering the first speaker 202. In other words, the cap structure 214 is integrally formed with the housing 110 to be an integrative unit.

Figure 13:
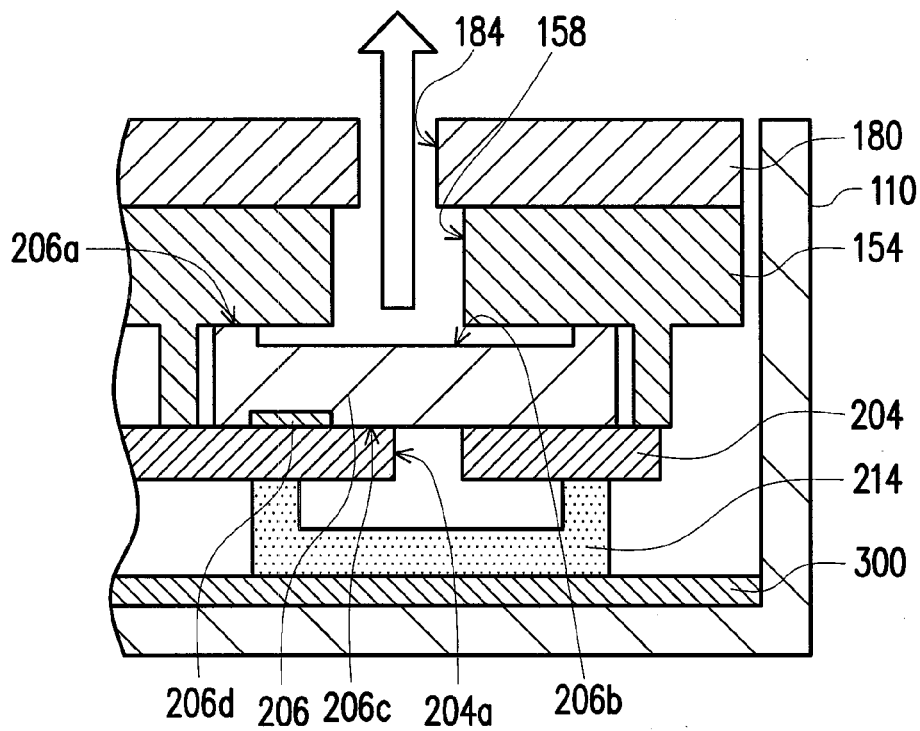
FIG. 13 is an enlarged cross-sectional view of the electronic apparatus, cutting at line III-III in FIG. 7, according to another embodiment of the application.

Further in FIG. 13, it is a design of top side type. As can be seen, the second speaker 206 is stacked on the third circuit board 204 with directly electrical contact. Specifically, the second speaker 206 has a top side 206a with a second sound hole 206b and a bottom side 206c with a second contact point 206d, and the second contact point 206d is electrical connected to the third circuit board 204. An additional cap structure 214 served as a sound box of the second speaker 206 is disposed below the third circuit board 204 and communicates with the second speaker 206 via a slot 204a of the third circuit board 204. In this structure, the protruding end plate 154 also has the aperture 158 indicated in FIG. 7, and the cover plate 180 also has the acoustic port 184, so that the sound can be transported forwardly out from the cover plate 180. In the present embodiment, since the antenna 300 is not seriously influenced by the third circuit board, the second speaker 206 may be stacked over the third circuit board 204.

In light of the foregoing, the application presents an appearance of an electronic apparatus as a smooth arc shape, and a stacking method inside a space of the electronic apparatus allows interior components to be disposed in a housing with a design of a curved surface or an inclined plane. Accordingly, the application can effectively utilize an interior space of a housing to increase a capacity of a battery module.

Although the application has been described with reference to the above embodiments, it is not intended to limit the application. It will be apparent to people of ordinary skill in the art that modifications and variations to the described embodiments may be made without departing from the spirit and scope of the application. Accordingly, the scope of the application will be defined by the attached claims not by the above detailed descriptions.

What is claimed is:

1. An electronic apparatus, comprising:
a housing having at least an opening and an accommodating space;
a first circuit board disposed in the accommodating space;
a battery module disposed in the accommodating space and stacked over the first circuit board;
a display module disposed in the accommodating space and stacked over the battery module, wherein the display module is visible through the opening;
a second circuit board disposed in the accommodating space and beside the battery module, wherein a part of the second circuit board is not disposed below the display module; and
a first speaker disposed in the accommodating space and disposed below the part of the second circuit board, wherein the first speaker has a top side with a first sound hole aligned to a slot of the part of the second circuit board.

2. The electronic apparatus of claim 1, wherein the first speaker has a bottom side with a first contact point, and the first contact point is electrically connected to the second circuit board.

3. The electronic apparatus of claim 1, wherein the width of the first circuit board is smaller than the width of the battery module and the width of the battery module is smaller than a width of the display module.

4. The electronic apparatus of claim 1, wherein an edge of the battery module in a width direction of the battery module is closer to a corresponding one of two sides of the housing opposite to each other than a corresponding edge of the first circuit board in a width direction of the first circuit board.

5. The electronic apparatus of claim 1, further comprising:
a frame stacked over the battery module and disposed below the display module to secure a relative position between the battery module and the display module, wherein the frame has a protruding end plate, and the protruding end plate has an aperture aligned to the first speaker of the second circuit board.

6. The electronic apparatus of claim 5, wherein the second circuit board is disposed below the protruding end plate of the frame, and the first speaker is either fixed to the protruding end plate and located in a slot of the part of the second circuit board, or fixed to the second circuit board and aligned to an aperture of the protruding end plate.

7. The electronic apparatus of claim 6, further comprising:
a first conductive part disposed on the bottom side of the first speaker and attached to the first contact point; and
a second conductive part contacting the first conductive part and the second circuit board separately.

8. The electronic apparatus of claim 7, wherein the first conductive part is a flexible printed circuit board, and the second conductive part is a conductive elastic pad.

9. The electronic apparatus of claim 1, further comprising:
a cover plate disposed at the opening, wherein the display module is located between the battery module and the cover plate, wherein the cover plate has an acoustic port aligned to the first speaker.

10. The electronic apparatus of claim 9, wherein an end side of the display module extends to the acoustic port, but does not covers the acoustic port.

11. The electronic apparatus of claim 1, further comprising:
a cap structure covering the second circuit board and the first speaker, and served as a sound box of the first speaker.

12. The electronic apparatus of claim 1, wherein the housing has a cap structure corresponding to the first speaker and covering the first speaker, and the cap structure is integrally formed with the housing as an integrative unit.

13. The electronic apparatus of claim 1, further comprising:
a third circuit board disposed in the accommodating space, beside the battery module and opposite to the second circuit board with respect to the battery module, wherein a part of the third circuit board is exposed from the display module; and
a second speaker disposed in the accommodating space and disposed below the part of the third circuit board, wherein the second speaker has a top side with a second sound hole aligned to a slot of the part of the third circuit board.

14. The electronic apparatus of claim 13, wherein the second speaker has a bottom side with a second contact point, and the second contact point is electrically connected to the third circuit board.

15. The electronic apparatus of claim 13, further comprising:
a frame stacked over the battery module and disposed below the display module to secure a relative position between the battery module and the display module, wherein the frame has a protruding end plate, and the protruding end plate has an aperture aligned to the second speaker.

16. The electronic apparatus of claim 15, wherein the third circuit board is disposed below the protruding end plate of the frame, and the second speaker is disposed between the protruding end plate and the third circuit board and communicated with an aperture of the protruding end plate.

17. The electronic apparatus of claim 13, further comprising:
a cover plate disposed at the opening, wherein the display module is located between the battery module and the cover plate, wherein the cover plate has an acoustic port aligned to the second speaker.

18. The electronic apparatus of claim 13, further comprising:
a cap structure disposed below the third circuit board, communicating with the second speaker via a slot of the third circuit board, and served as a sound box of the second speaker.

19. The electronic apparatus of claim 13, further comprising:
a second antenna disposed inside the housing, wherein at least a part of the second antenna is orthogonally overlapped with the third circuit board.

20. The electronic apparatus of claim 1, further comprising:
a first antenna disposed inside the housing, wherein at least a part of the first antenna is orthogonally overlapped with the second circuit board.

* * * * *